United States Patent Office 2,830,192
Patented Apr. 8, 1958

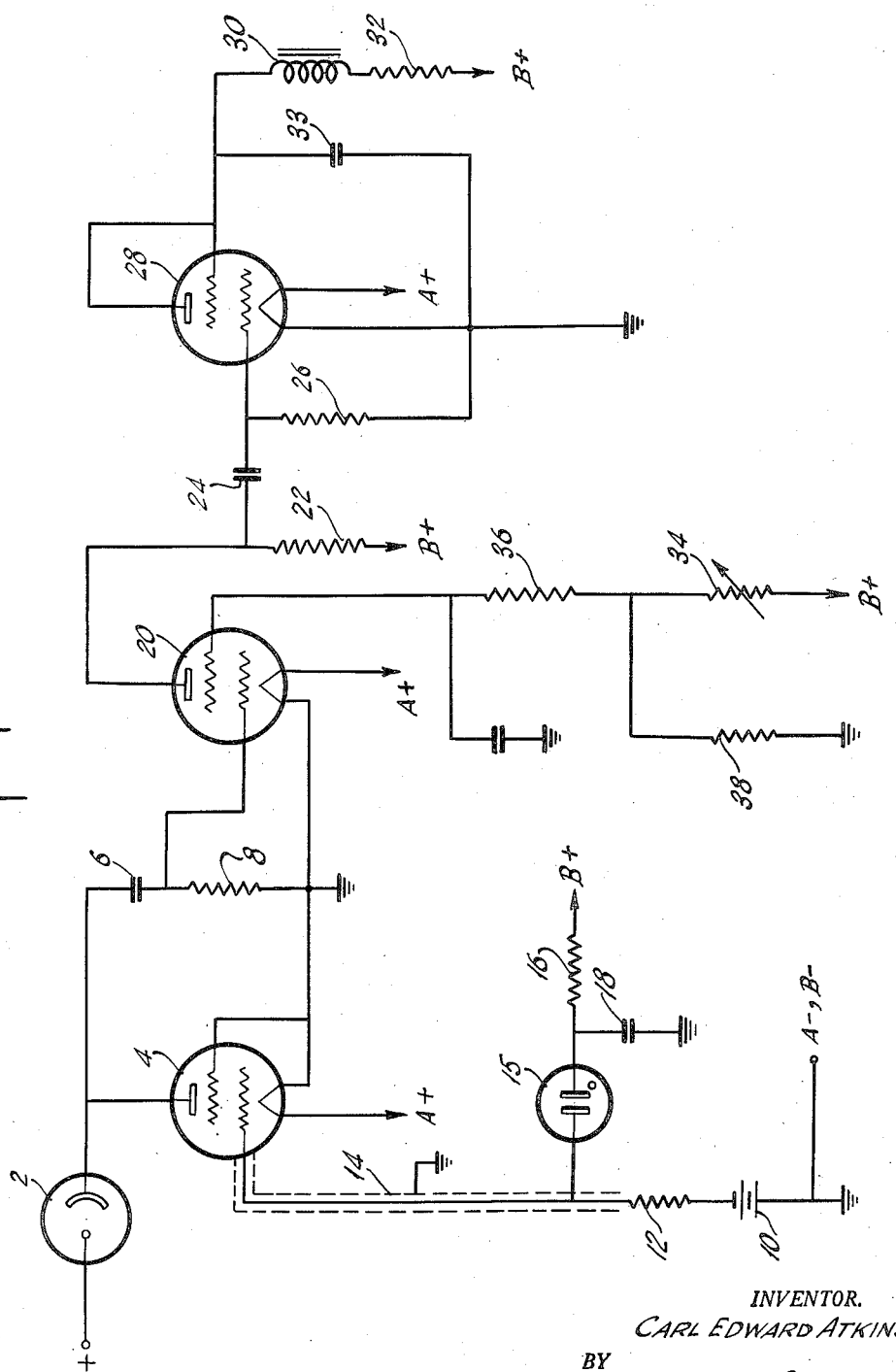

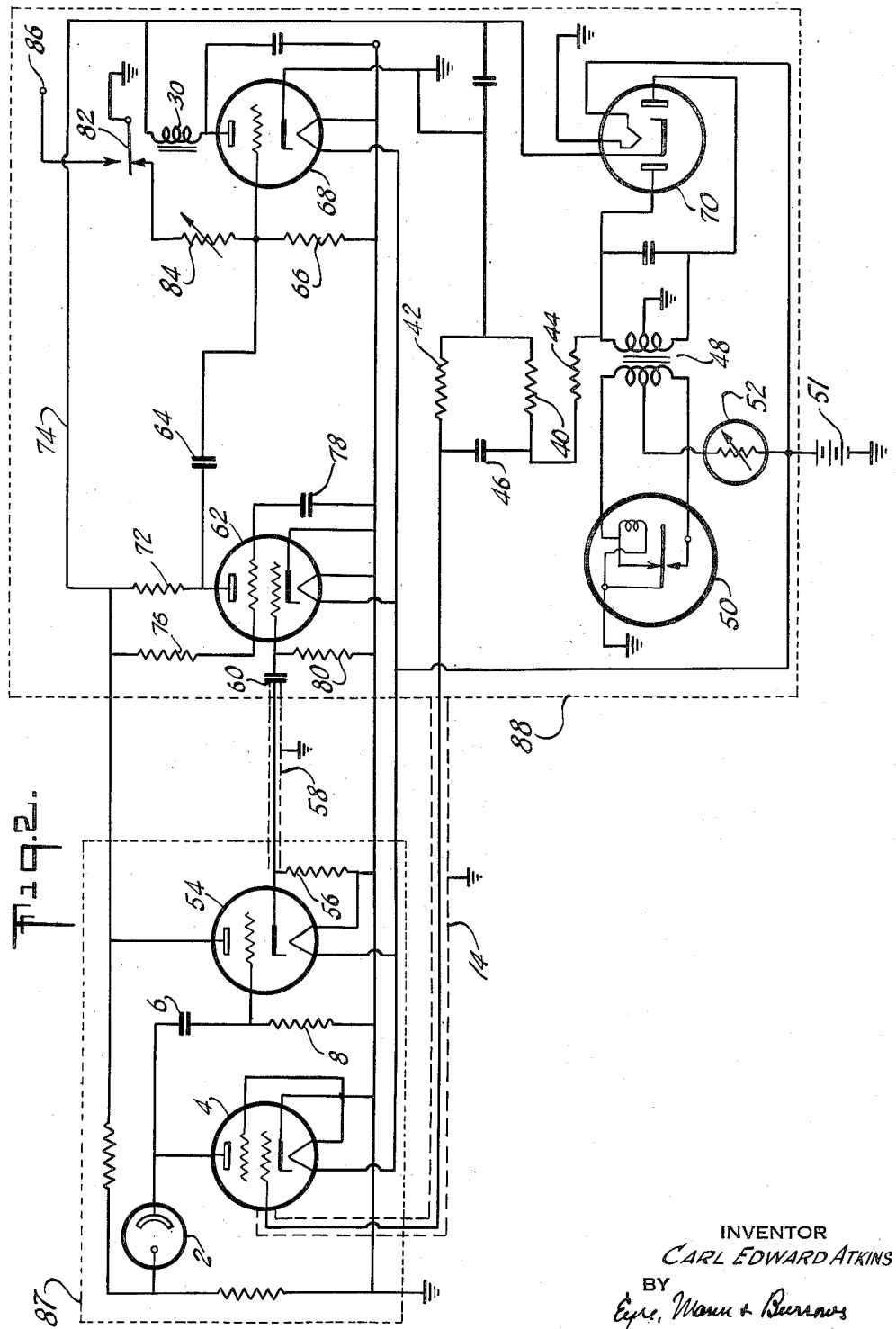

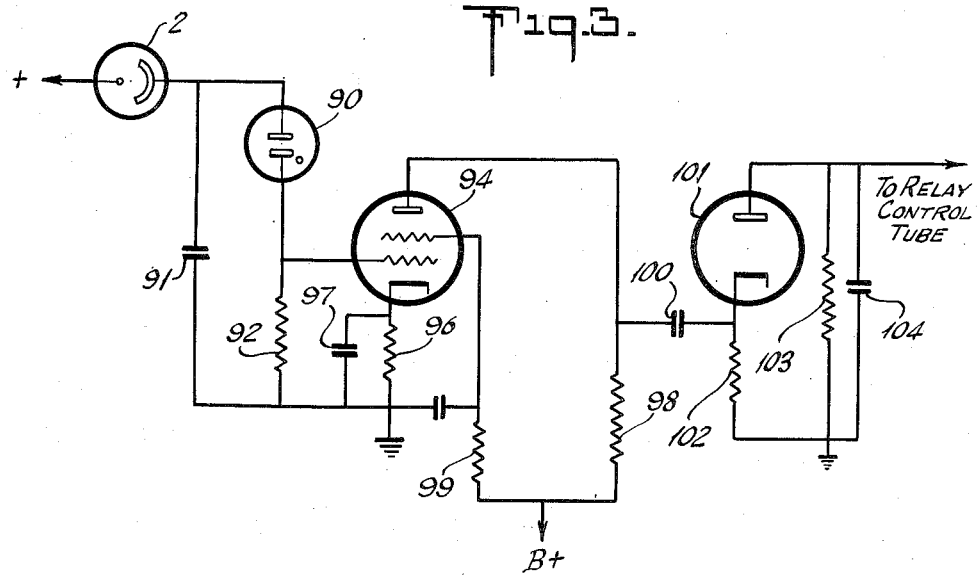
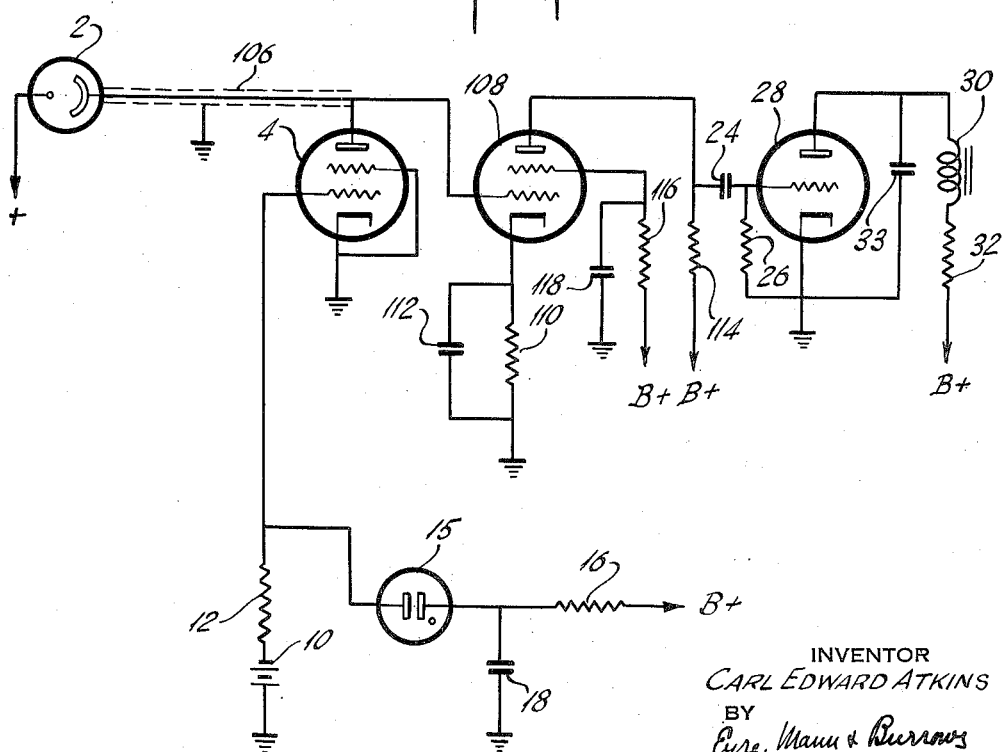

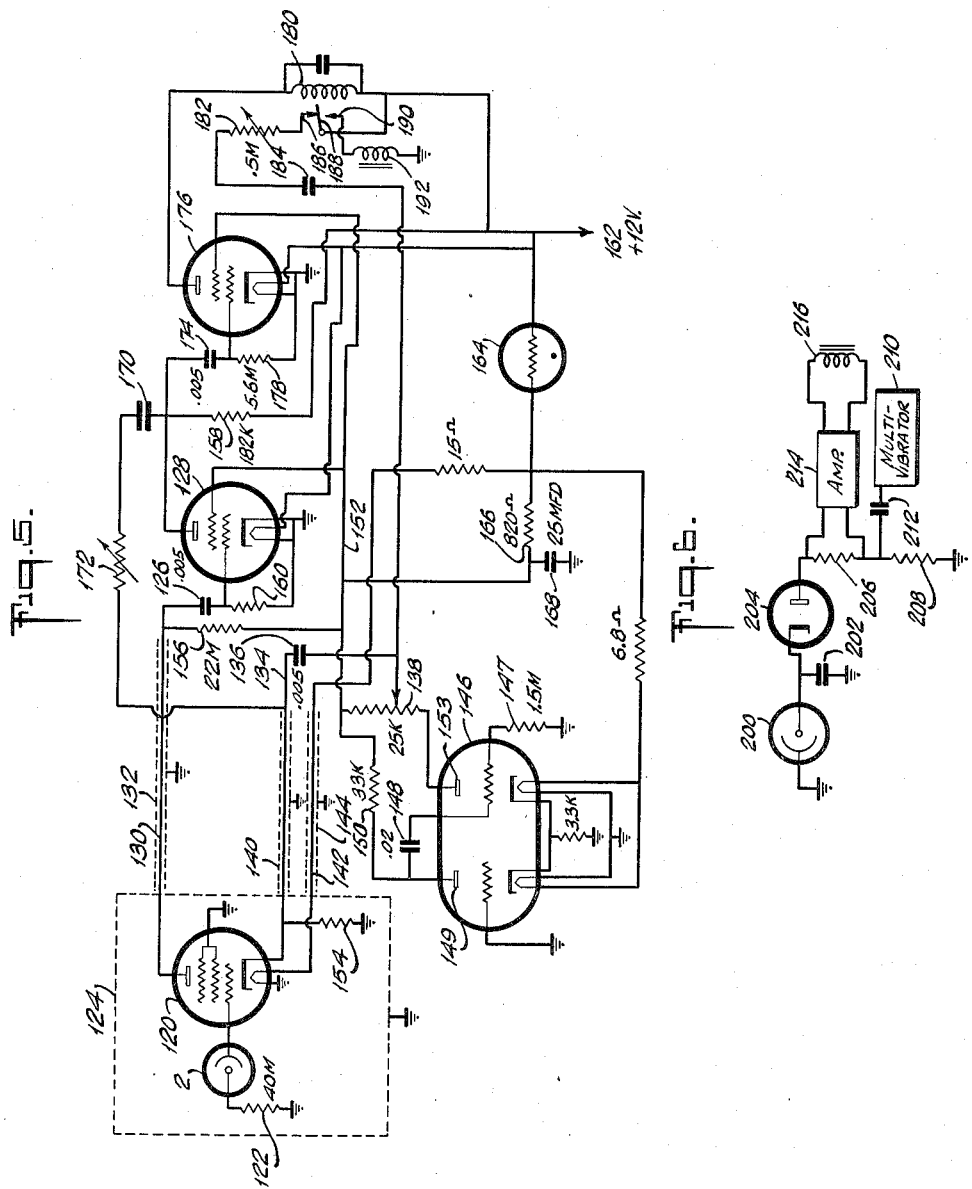

2,830,192

LIGHT RESPONSIVE CIRCUIT

Carl Edward Atkins, Bloomfield, N. J., assignor to Tung-Sol Electric Inc., Newark, N. J., a corporation of Delaware Application August 19, 1953, Serial No. 375,236

21 Claims. (Cl. 250—214)

The present invention relates to photo control circuits and comprises novel means for converting weak photoelectric currents into relatively large electrical signals suitable for control purposes. The invention may be advantageously employed whenever it is desired to activate or deactivate one or more devices in response to the incidence of light or to measure or record light intensity. For example, the invention may be employed for the control of the low beam of an automobile headlamp in response to light received from the headlamps of an approaching car, or for recording or indicating light from stars or planets, or for detecting infra red light.

An important feature of the invention is that circuits embodying the same require only conventional, readily available and relatively inexpensive components. The circuits utilize a single simple photoelectric tube as the light responsive device and yield an output signal comparable in magnitude to a signal obtained in conventional circuits utilizing photo multiplier tubes. The expense incident to use of a photo multiplier tube and the high voltage supply necessary for operating such a tube are thus obviated in circuits embodying the invention.

Another feature of the invention is the means whereby alternating, rather than direct, current amplification may be utilized, thus avoiding the problems incident to instability of direct current amplifiers.

Depending upon the intensity of the light incident on the photo sensitive device and upon the circuit constants, the circuits of the invention may be considered either as operating to accumulate over periods of time the current through the photo-sensitive device, and then to release such accumulated current intermittently or as operating to intermittently recharge an accumulator which, during the intervals between recharge, loses some of its charge by virtue of the photoelectric current. In either case the voltage pulses occurring during discharge or recharge vary as a function of the total photoelectric current between periods of charge or recharge of the accumulator. Thus voltages of sufficient magnitude for ready amplification by alternating current amplifiers are obtained. More specifically, a capacitor or current accumulator is connected to a photoelectric tube so as to have its charge varied in accordance with the flow of electrons from the cathode of the tube. The capacitator is connected to a "gating" device through which, at intervals, the capacitor may charge or discharge. The created voltage pulses are amplified to produce electrical signals suitable for control of relays, recording devices or the like.

In certain embodiments of the invention the gating device is an electronic tube biased beyond cutoff and means are provided to remove the bias intermittently and thereby cause current to flow through the tube to create voltage pulses which vary with the condition of the accumulating means at the instants of bias removal and, therefore, with the total photoelectric current between such pulses. In another embodiment of the invention the gating device is a neon tube which passes current only when the charge of the accumulator has reached a predetermined voltage. In this case the frequency of the pulses appearing across a resistor are a function of the magnitude of the photoelectric current.

For a better understanding of the invention and of specific circuits embodying the same, reference may be had to the accompanying drawings, of which—

Fig. 1 is a schematic diagram of a circuit embodying the invention and employing a relaxation oscillator for control of the gate tube;

Fig. 2 is a schematic diagram illustrating another embodiment of the invention wherein a vibrator power supply is coupled to the gate tube for control thereof;

Fig. 3 is a schematic diagram of a circuit wherein the frequency of energization of the gate tube is a function of the current through the photoelectric tube;

Fig. 4 is a schematic diagram of a circuit similar in many respects to that of Fig. 1 but illustrating an arrangement wherein the gate tube is physically remote from the photoelectric tube;

Fig. 5 is a schematic diagram of a low voltage system particularly adapted for use in control of automobile headlamps and representing the presently preferred embodiment of the invention;

Fig. 6 is a diagram of a circuit illustrating an arrangement wherein the anode rather than the photo cathode of the photoelectric tube is connected to the accumulating means and to the gating means.

In Fig. 1 a photoelectric tube 2, which may be, for example, a No. 930 or a No. 925 photo tube has its anode connected to a source of positive potential, for example 90 volts, and its cathode connected to the anode of a gate tube 4 and to a capacitor 6. Tube 4 may be, for example, a No. 5875. It is preferably positioned close to the photo tube 2, as is also the capacitor 6 and the first amplifier tube. The cathode of tube 4 is grounded and connected through a resistor 8 of, for example, eight megohms to the other side of capacitor 6. Tube 4 is normally cut off by a negative bias impressed from a C battery 10 which is connected to the grid of tube 4 through a resistor 12 and a shielded and grounded cable 14. Resistor 12 forms part of a relaxation oscillator, the other elements of which comprise a neon lamp 15, a high resistance 16, and a condenser 18. One terminal of the condenser 18 is grounded, as is the positive terminal of the C battery 10. The other terminal of the condenser 18 is connected to the junction of the neon lamp and resistor 16. A source of positive potential, indicated as B+ and of the order of 180 volts, is applied to the end of resistor 16 remote from the neon lamp 15. With this arrangement the condenser 18 is charged by the voltage through the resistor 16. When the voltage across condenser 18 reaches the break-down voltage for the lamp 15, which may, for example, be 70 or 80 volts, the lamp breaks down and condenser 18 discharges through resistor 12 and the C battery 10, thus applying a positive pulse to the grid of tube 4.

When a positive pulse appears at the grid of tube 4 the current through that tube will depend upon the total photoelectric current that has passed through the photoelectric tube in the interval preceding the pulse. Whether the current through the tube 4 is considered as a charging or a discharging current of the capacity 6 is relatively unimportant, as will be apparent from the following. Consider first the condition of no light incident on the photo cathode, then when the first positive pulse appears at the grid of tube 4, electrons will pass to the anode to charge the condenser 6 negatively. After one or more pulses, however, no current will pass as the potential of the anode is too low. If now light is incident on the photo cathode, this negative charge on the capacity 6 can leak off as electrons are given up by the photo cathode. If the photo current is high enough or the spacing between pulses wide enough, the capacity 6 may become positively charged before another pulse appears at the control grid of tube 4. In such case the condenser may be considered as discharging through the gate tube. If the photo current is small enough or the pulses frequent enough, the capacity 6 may still be slightly negatively charged when the next pulse appears at the control grid. Under these conditions the current through the gate tube may be considered as a recharging current for the condenser. In any event, the current through the tube at the successive pulses is a function of the total photoelectric current passed by the photo tube during the interval between pulses and the current through tube 4 will flow through resistor 8. The ungrounded end of resistor 8 is connected to the control grid of an amplifier tube 20, the cathode of which is grounded and the anode of which is connected through a resistor 22 to B+. Tube 20 may, like tube 4, be a No. 5875. Tube 20 thus normally passes current but when a negative pulse of sufficient magnitude due to current through resistor 8 appears at the grid of tube 20 the plate current will decrease, causing an amplified positive pulse to appear across resistor 22. These pulses are then fed through a coupling network comprising a condenser 24 and high resistance 26 to the grid of an output tube 28. The plate of tube 28 is connected to B+ through the winding of a relay 30 and a resistor 32. A condenser 33 for by-passing to ground the alternating component of the plate current of tube 28 is connected between the anode of that tube and ground. The screen grid of tube 4 is grounded and that of tube 20 is maintained at a positive potential less than that of B+ by means of a network comprising resistors 34 and 36 connected in series between the grid and B+ and a resistor 38 connected between ground and the junction of resistors 34 and 36. Resistor 34 is adjustable for control of the gain of the amplifier. The screen grid of tube 28 is maintained at plate potential.

The operation of the above described circuit has been in part described. In the absence of pulses, that is, when no light is incident upon the tube 2, tube 28 draws enough current to maintain the relay 30 energized. The amount of this current is determined in part by the resistor 32, which may be, for example, 7000 ohms. When pulses begin to appear at the grid of tube 28 a negative potential is developed across resistor 26. The larger the pulses the greater this negative potential and the less the space current of tube 28 becomes. When the current through the tube reduces to a predetermined value corresponding to a given intensity of light falling on the photocell over a given period of time, the relay releases.

The function of resistor 32 in the load circuit of tube 28 is to provide a falling potential on the plate of tube 28 with rise in tube current, thereby increasing the sensitivity of the circuit, and delaying reenergization of the relay when the light incident on the photoelectric tube 2 decreases. Thus when the circuit is employed for control of low beam headlights of an automobile in response to light from the headlamps of an approaching car, reduction in incident light occasioned by dimming of the lights of the approaching car will not cause reenergization of relay 30. In the circuit of Fig. 1 the frequency of the relaxation oscillator will depend upon the capacity of condenser 18, upon the magnitude of resistor 16, and upon the breakdown voltage of the neon lamp 15. With a condenser of .007 microfarads and a value of resistor 16 of 4.7 megohms the frequency is approximately 100 cycles per second for a B voltage of 180 volts. This frequency has a bearing on the sensitivity of the circuit because as the pulses become less frequent, there is more time to accumulate charge in the capacitor 6. However, since the gain of the amplifier falls off with dropping B voltage and the frequency of the oscillator likewise decreases, it is possible to adjust these ratios, as by means of resistor 34, to obtain a measure of compensation.

In order to obtain reliable operation of the above described circuit it is important that leakage in the photoelectric tube 2 be maintained at a minimum. Furthermore, the gating tube 4 should be positioned physically close to the photo tube 2, as should also the first amplifier stage because the capacity to ground at the photo cathode must be kept as small as possible. It is also important, of course, that light from the neon lamp or from the electron tube heaters be kept out of the photo tube 2.

In the embodiment of the invention illustrated in Fig. 2 the relaxation oscillator of Fig. 1 is replaced by a voltage from a vibrator power supply and the first amplifier is connected as a cathode follower. In this embodiment of the invention the tube 2 is connected as in Fig. 1 with its cathode coupled to the anode of the gate tube 4 and to one terminal of capacitor 6. The control grid of tube 4 is connected through the shielding and grounded cable 14 to a network comprising resistors 40, 42 and 44 and a condenser 46. Resistors 40 and 42 are connected in series across the condenser 46 with their junction grounded, and resistor 44 is connected between the junction of resistor 40 and condenser 46 and one end of the center grounded secondary of a transformer 48, the primary of which is connected across contacts of a vibrator 50. Positive potential from a battery 51 is connected through a ballast tube 52 to a center tap on the primary of transformer 48. The network comprising the resistors 40, 42 and 44 and condenser 46 thus supplies to the grid of tube 4 both a keying pulse and a self-bias for the tube. An amplifying tube 54 has its control grid connected to the ungrounded end of resistor 8 and its cathode connected through a load resistor 56 to the ground. The cathode of tube 54 is connected through a shielding and grounded cable 58 and through a condenser 60 to the control grid of an amplifier 62. The output of amplifier 62 is coupled through a condenser 64 and grid bias 66 with the grid of the relay control tube 68. Operating voltage for the plates of the tubes 54, 62 and 68 is supplied from a full wave rectifier 70 energized from the secondary of transformer 48, a dropping resistor 72 being provided between the plate of tube 62 and the high voltage line 74 and the winding of the relay 30 being included between the anode of tube 68 and the high voltage line. The screen grid of tube 62 is connected to the line 74 through a resistor 76 and to ground through a condenser 78. A bias resistor 80 is provided for the control grid of tube 62.

The operation of the above described circuit of Fig. 2 being substantially like that of Fig. 1 will be clear from the foregoing description of the various elements of the circuit. The tube 68 is normally energized to energize the relay 30. When negative pulses of sufficient magnitude are impressed upon tube 68 resulting from application of negative pulses to the grid of tube 62, the relay will release for actuation of any desired device to be controlled. The circuit of Fig. 2 is particularly suitable for use in automobiles for control of the low beam of the headlamp in response to incidence of light on the phototube from the headlights of approaching cars, the car battery serving to energize the vibrator power supply. As heretofore indicated, when the circuit is used for control of the low beam of automobile headlights, it is advisable that the sensitivity of the circuit be increased after deenergization of the relay 30. For this reason the grounded armature 82 of the relay 30 when in attracted position places an adjustable resistor 84 in parallel with the grid resistor 66 of tube 68. Upon release of the relay 30 in response to light of a given intensity falling upon the phototube 2, armature 82 opens the circuit of resistor 84, thus increasing the sensitivity of the tube 68 and preventing reenergization of the relay 30 when the operator of an approaching car dims his headlights. Armature 82 in retracted position may complete the circuit of the usual car relay controlling the automobile headlights, which relay may be connected to terminal 86. As indicated by the cables 14 and 58, the parts of the system including the phototube 2, gate tube 4, capacitor 6, and amplifier 54 should be located in close proximity with the tube 2 positioned of course for optimum reception of light from approaching headlights. The remainder of the circuit may be located at any convenient point in the automobile. Preferably the parts are mounted in two grounded housings, as indicated by the dashed rectangles 87 and 88, the former containing the phototube and adjacent components and the latter the vibrator power supply and the remainder of the circuit.

In each of the embodiments of the invention thus far described the magnitude of the pulses presented to the amplifier varies with the charge on capacitor 6 accumulated during a predetermined interval.

In the embodiment of the invention illustrated in Fig. 3, to which reference may now be had, the magnitude of the pulses is constant but the frequency thereof varies with the current through the photoelectric cell 2. In Fig. 3 the cathode of the cell 2 is connected to a neon lamp 90 comprising the gating device and to a capacitor 91 corresponding in function to capacitor 6 of Figs. 1 and 2. The other terminal of capacitor 91 is connected to ground and the other terminal of lamp 90 is connected to ground through a resistor 92 in the grid circuit of an amplifier tube 94. Tube 94 is self-biased by a resistor 96 by-passed by condenser 97 in the cathode circuit of the tube. Positive potential is applied to the anode of tube 94 through a resistor 98 and to the screen grid of the tube through a resistor 99. When the capacitor 91 accumulates a sufficient charge to break down the neon lamp 90, the capacitor discharges through resistor 92, presenting a positive pulse to tube 94 for amplification thereby. The resulting negative pulse appearing at the anode of tube 94 is impressed through a condenser 100 upon the cathode of a diode 101, causing the diode to pass current through a circuit comprising resistors 102 and 103 in series. The junction of resistors 102 and 103 is grounded and a condenser 104 is connected across resistor 103. Thus the voltage appearing at the anode of diode 101, corresponding to the voltage across the network comprising resistor 103 and condenser 104, may be applied to an output tube such as the tube 68 of Fig. 2 or the tube 28 of Fig. 1. In this circuit the amplitude of the various pulses is always the same but their frequency changes in accordance with the amount of light falling on the photo cathode of tube 2. The potential across the network comprising resistor 103 and condenser 104 will rise with the number of pulses per second and thus will vary with the magnitude of the photoelectric current. Thus the network comprising resistor 103 and capacitor 104 serves as an integrating network to yield a voltage varying with the frequency of the pulses.

In Fig. 4 is shown a circuit similar in many respects to that of Fig. 1. In this embodiment of the invention the gate tube 4 is positioned remotely from the phototube 2 and connected thereto through a shielding and grounded cable 106 which forms a capacitance corresponding to the capacitor 6 in Fig. 1. The control grid of gate tube 4 is controlled as in Fig. 1. The anode of tube 4 is connected directly to the grid of an amplifier tube 108. The cathode of tube 108 is maintained at positive potential by a resistor 110 by-passed by a condenser 112 and positive potential is supplied to the anode and screen grid of the tube through respective resistors 114 and 116, the latter by-passed by a condenser 118. The remainder of the circuit is that of Fig. 1 and hence needs no further description. In operation, light quanta at the photo cathode produce emitted electrons which are picked up by the positively charged anode. This leaves positive charge in the cable capacitance or reduces the negative charge thereof resulting from the initial pulsing of the grid of the gate tube, depending upon the rate of pulsing and the intensity of the light as heretofore discussed. The current through the gate tube when the grid is pulsed will vary as a function of the condition of the cable capacitance, and hence negative voltage pulses varying with the light intensity will be impressed on the grid of the first amplifier as in the case of the circuits heretofore described.

Thus in this embodiment of the invention the separate condenser and the grid resistor for the first amplifier are omitted, the cable capacitance serving the purpose of the condenser and the positive bias on the cathode of amplifier 108 obviating the necessity for the grid resistor. Obviously, if desired, depending upon the length of cable 106, the intensity of the light on tube 2 and the frequency of the relaxation oscillator, a condenser such as condenser 6 and a grid resistor such as resistor 8 could be employed with a cathode grounded amplifier as in the circuit of Fig. 1.

In each of the circuits so far described that develop pulses which vary in magnitude as a function of light intensity, the photo cathode is connected to the anode of a gate tube and to a capacity that has been provided especially for the purpose of the circuit and which is of substantial magnitude because all of the charge accumulated thereby is not usefully employed. Instead of connecting the photo cathode to the anode of the gate tube, it can be connected to another electrode of the gate tube, for example, to the control grid or to the screen grid, and certain advantages result when such alternative connection is made. Also, certain advantages accrue, particularly when the circuit is to be employed for control of the dimming of automobile headlights, when the accumulating means associated with the gate tube are of small capacity, provided that the entire charge thereof is utilized for the purpose of the circuit. The circuit of Fig. 5, to which reference may now be had, illustrates an arrangement wherein full benefit of a small accumulator, one inherently present in the circuit and not specifically provided for the purpose, is obtained, and wherein the photo cathode is connected to the control grid of the gate tube rather than to the anode of that tube. The circuit of Fig. 5 also illustrates other novel features particularly adapted for use in auto dimming circuits. Such features include means whereby the circuit may be operated from a 12-volt car battery without requiring provision of a vibrator power supply, the provision of a negative feedback connection for stabilization of the amplifier with change in battery voltage, and an amplifier circuit so designed as to respond positively to pulses of a predetermined magnitude indicating the presence of a light signal while insensitive to pulses of lesser magnitude which might result from the pulsing of the gate tube.

In this embodiment of the invention the gate tube comprises a beam-type pentode 120 such as a 6AK6. The photo cathode of the photocell 2 is connected directly to the No. 1 grid of the pentode 120 and the anode of the photocell 2 is connected through a high resistance 122 of the order of 40 megohms to ground. The accumulating means of this circuit comprise the inherent capacity between the photo cathode and photo anode of the photo tube 2, between the photo cathode and ground, between the No. 1 grid of the gate tube 120 and the other electrodes of the gate tube. This small inherent capacity of the above described connection between the photo cathode and No. 1 grid of the gate tube, is particularly advantageous in the case of auto dimming circuits because it is important that when light ceases to fall upon the photo cathode the headlights of the car be promptly returned to high beam. When cars traveling at high speeds pass each other it is naturally desirable that high beam conditions be restored as rapidly as possible and such quick restoration of high beam condition can be obtained by making the capacity coupled to the photo cathode as small as possible to permit rapid recharge thereof by the electrons passing from the cathode of the gate tube when the tube is pulsed. The gate tube and the photo tube are positioned close together and within a grounded enclosure 124 with the photo tube positioned for reception of light from oncoming cars. The remainder of the circuit may be disposed at any convenient place on the car and connected to the gate tube through shielded leads.

Recharging the above described capacity, associated with the photo cathode and No. 1 grid of the gate tube is effected by application of negative pulses to the cathode of the gate tube from a multivibrator circuit. The anode of the gate tube 120 is connected through a condenser 126 to the grid of an audio power beam-type amplifier tube 128. The lead 130 connecting the anode to the condenser 126 is provided with a grounded shield 132 and the lead 134 connecting the cathode of the gate tube through a condenser 136 to a tap on a plate load resistor 138 of the multivibrator circuit is protected by a grounded shield 140. Similarly, the lead 142 to the cathode heater of the gate tube is protected by a grounded shield 144. The multivibrator circuit includes a double triode 146 which may be a 12AU7. One control grid of the tube 146 is connected directly to ground and the other is connected to ground through a relatively high resistor 147 of the order of 1½ megohms and through a condenser 148 to the anode 149 of the other half of the tube. Anode 149 is connected through a dropping resistor 150 to a lead 152 maintained at a potential of about 8 volts, as hereinafter described. The other anode 153 of the double triode is connected to the lead 152 through the dropping resistor 138. The cathodes of the double triode 146 are connected to ground through a cathode resistor of about 3.3K. Thus the cathode of the gate tube 120, which is ordinarily maintained at positive potential by virtue of a resistor 154, is intermittently pulsed negatively from the multi-vibrator circuit to permit electrons to flow to the No. 1 grid to charge the inherent capacity associated therewith and to pass current through the gate tube in an amount dependent upon the intensity of light falling upon the photo cathode, as described in connection with the other embodiments of the invention. Positive potential from the line 152 is impressed upon the anode of the gate tube through a high resistor 156 of the order of 22 megohms, and hence when the gate tube passes current negative pulses will appear at the control grid of tube 128.

The No. 2 and No. 3 grids of the gate tube are connected together and to ground. This arrangement has been found of value when a beam-type pentode such as a 6AK6 is employed for the gate tube. If the screen grid were maintained positive, the increase in screen current with increase in potential of the No. 1 grid or decrease in potential of the cathode is sufficient at times to cause an actual reduction rather than increase in the plate current and hence false signals tend to appear at the anode of the gate tube each time the cathode is pulsed. By grounding the screen grid the screen current is not increased with increase in potential of the No. 1 grid or reduction in potential of the cathode, and no false signals, or but very minute false signals, appear.

The arrangement now to be described in connection with the amplifier tube 128 insures that only pulses corresponding to actual light signals will be passed on to the rest of the circuit. The amplifier 128, as previously indicated, is an audio power beam-type tube such as a 12AR5. This tube is provided with a plate load resistor 158 of a magnitude substantially greater than the load resistor specified for rated load. A resistor, for example, of 182K is employed in the present circuit which is over twenty times the resistance ordinarily employed with such type of tube. With such high resistance, the plate voltage becomes actually negative with full current through the tube and hence when negative pulses are impressed upon the grid, the plate voltage will not change until near the peak of the signal. At that time there will be a sudden large gain in plate potential. Thus, when small negative pips occur at the anode of the gate tube, such as might be occasioned from the pulsing of the cathode in the absence of light, these pips are too small to affect the amplifier tube 128, but when larger pips appear, indicating the presence of light, the amplifier will respond with substantially full power. The amplifier tube is provided with the grid leak resistor 160 and the screen grid of the amplifier is connected to the 8-volt line 152. Eight volts are applied to the conductor 152 from the battery, the positive terminal of which is indicated at 162, through a ballast tube 164 and a small resistor 166. A condenser 168 connected between the 8-volt line 152 and ground filters out any A. C. hum.

To stabilize the amplifier for change in battery voltage a negative feedback line is provided comprising a series circuit of a condenser 170 and a variable resistor 172 connected between the anode of the amplifier 128 and the cathode of the gate tube. Thus, when the battery voltage increases tending to increase the gain of the amplifier, the potential at the cathode of the gate tube is increased to reduce the magnitude of the negative pulses impressed upon the amplifier tube, and conversely, when the battery voltage decreases, tending to reduce the gain of the amplifier, the cathode potential is correspondingly reduced to increase the signal to compensate for such voltage fluctuations.

The output of the amplifier 128 is connected through a condenser 174 to the control grid of the relay tube 176 which, as in the embodiments of the invention previously decribed, is normally energized and is deenergized when a sufficiently negative potential is applied to its control grid as a result of amplification of the pulses applied to the amplifier tube. The large grid bias resistor 178 of the relay control tube insures that the grid will be driven sufficiently negative to deenergize the relay 180 in the plate circuit of the relay tube 176 when amplified pulses of sufficient magnitude appear at the control grid of the relay tube. Associated with the contacts controlled by the relay 180 is a control for insuring that the relay, once it is deenergized, will not be reenergized when the lights of the approaching car are dimmed. This control which increases the sensitivity of the circuit during deenergization of the relay, comprises an adjustable resistor 182 and a capacity 184 connected in series between the tap on load resistor 138 and a front contact 186 of the relay. The movable armature 188 of the relay is connected to the high potential end of the relay winding, and the back contact 190 is connected to the power relay 192 for operation of the dimming switch (not shown). With this arrangement, the magnitude of the negative pulses applied to the cathode of the gate tube 120 are increased upon release of the relay armature and energization of the power relay. Hence the circuit is rendered more sensitive and the relay will not be reenergized when the approaching car dims its headlights. Adjustment of the sensitivity of the circuit during normal conditions can be made by adjustment of resistor 182 and of the degree of degeneration by adjustment of resistor 172.

It will be noted that in the circuit of Fig. 5 no positive potential is applied to the anode of the photoelectric tube 2, the anode being connected to ground through a high resistor. This arrangement is desirable when the grid of the gate tube is connected to the photo cathode as it insures that the grid of the gate tube will never go positive with respect to ground and hence better control of the operation of the gate tube can be obtained.

The operation of the system of Fig. 5 has been explained in connection with the description of the elements of the circuit. As in the case of the circuits of Figs. 1, 2 and 4, negative pulses, varying in magnitude as a function of the intensity of light incident on the photo cathode, appear at the anode of the gate tube and are impressed upon the amplifier. Also, as in the circuits of Figs. 1, 2 and 4, the condition of charge of accumulating means associated with the photo cathode determine the magnitude of the current through the gate tube when the tube is pulsed. In each case electrons from the gate tube cathode tend to charge the accumulating means negatively and the photoelectric current due to incident light reduces such negative charge and tends to charge the accumulating means positively. In each case when the gate tube is pulsed, part or all of the tube completes an electrical bridging circuit across the accumulating means for charge or discharge thereof. The principal difference between the circuits of Figs. 1, 2 and 4 and that of Fig. 5 is that in the first mentioned circuits the gate tube is entirely in such bridging circuit, whereas in the circuit of Fig. 5, only the No. 1 grid and cathode of the gate tube are in the bridging circuit.

In each of the circuits so far described the photo cathode of the photoelectric tube has been connected to the accumulating means. In Fig. 6, to which reference may now be had, the invention is embodied in a circuit wherein the photo anode, rather than the photo cathode, is connected to the accumulating means. In Fig. 7 the cathode of the photoelectric tube 200 is grounded and the anode connected to one plate of a condenser 202, the other plate of which is grounded, and to the cathode of a diode 204. The anode of the diode is connected through series resistors 206 and 208 to ground and is positively pulsed from a multivibrator 210 connected through a condenser 212 to the junction of resistors 206 and 208. An amplifier 214 is connected across resistor 206 for energization, or deenergization, depending upon the internal connections of the amplifier, of a relay 216 when pulses appear at the anode of the diode of a magnitude varying as a function of the intensity of light incident on the photo cathode. In the absence of light the positive charge accumulated by the condenser 202 after the first one or two positive pulses from the multivibrator will block the diode. When light is incident on the photo cathode the charge on the condenser 202 will leak off between pulses at a rate determined by the intensity of the light and hence the current passed by the diode at each pulse from the multivibrator will vary with the condition of condenser 202 and voltage pulses varying with the diode current will be impressed upon the amplifier.

The invention has now been described with reference to several embodiments thereof. Obviously, the invention is not limited to the particular circuits nor to the particular components thereof illustrated in the drawings. Various alternative circuit arrangements will occur to those skilled in the art. For example, although the circuits have been illustrated as adapted to deenergize a relay upon increase in incident light, they could as well be arranged to energize a relay upon increase in light.

In its broadest aspects the invention comprises the provision of means for integrating relatively minute currents of a photoelectric tube and for creating, in response to such integrated current, voltage pulses suitable for amplification by alternating current techniques. In one embodiment of the invention the frequency of such pulses is a measure of the photoelectric current. In other embodiments of the invention, the amplitude of such pulses, the frequency being constant, is a measure of the photoelectric current. In each embodiment relatively strong signals are obtained from the minute current of a simple photoelectric cell. Although the application of the invention to the control of automobile low beam headlights has been stressed in the description, obviously other fields of use of the new circuits will occur to those skilled in the art.

This application is a continuation-in-part of my prior application Serial No. 297,946, filed July 9, 1952, now abandoned entitled Light Responsive Circuit.

I claim:

1. The combination with a photoelectric tube having a single light sensitive element and an anode of means for creating an amplified alternating current signal varying as a function of the intensity of light incident on said element, comprising current accumulating means connected to the photoelectric tube, gating means connected to said accumulating means and completing a discharge path therefor when actuated, a source of fluctuating voltage connected to said gating means for intermittently actuating the same, said gating means when intermittently actuated creating a series of voltage pulses varying as a function of the condition of charge of said accumulating means and alternating current amplifying means for amplifying the created voltage pulses.

2. The combination according to claim 1 wherein said gating means comprises an electron tube connected in series with an impedance across said accumulating means, said source being connected to an electrode of said electron tube to intermittently render said tube conductive whereby the amplitude of said pulses varies with the intensity of light incident on said element.

3. The combination according to claim 2 wherein said electronic tube includes a control grid, said source comprises a vibrator power supply and a network coupled to said supply and to said electronic tube for impressing on the control grid of the electronic tube both a negative bias and a keying pulse.

4. The combination according to claim 1 wherein said gating means comprises an electronic tube, said accumulating means and said photoelectric tube being connected to an electrode of said electronic tube, said source comprises a vibrator power supply and a network coupled to said supply and to said electronic tube for impressing on an electrode thereof both a bias for rendering the electronic tube non-conducting and a keying pulse for intermittently rendering the electronic tube conducting.

5. The combination according to claim 1 wherein said gating means comprises an electronic tube connected to said accumulating means to provide a discharge path therefor when rendered conductive, said electronic tube having a control grid biased beyond cut-off, and said source comprises a relaxation oscillator connected to said grid for intermittently removing the bias thereon to render said electronic tube conductive.

6. The combination according to claim 1 wherein said gating means is physically remote from said photoelectric tube and is connected thereto through a conductor provided with a grounded shield, said conductor and grounded shield comprising said accumulating means.

7. The combination according to claim 18 wherein said gating means comprises a pentode having a cathode, three grids and an anode, a cathode resistor connected to said cathode for biasing said electronic tube to cut-off, and means coupled to said source for negatively pulsing said cathode for intermittently rendering said electronic tube conducting, the first grid of said electronic tube being connected to said light sensitive element of said photoelectric tube.

8. The combination according to claim 18 including a storage battery power source for said amplifying means and means including a negative feedback connection for stabilizing said amplifying means against battery voltage fluctuations.

9. The combination according to claim 18 wherein said gating means includes an electronic tube having an anode, a cathode and three grids, one of said grids being connected to the light sensitive element of said photoelectric tube, the other two of said grids being grounded and means coupled to said source for negatively pulsing said cathode and wherein said amplifying means are connected to the anode of said electronic tube and include an amplifying tube and circuit elements associated therewith having magnitudes such as to render the same insensitive to negative pulses appearing at the anode of said first mentioned electronic tube of less than a predetermined magnitude.

10. The combination according to claim 1 wherein said photoelectric tube has a single anode and said accumulating means is connected thereto and wherein said gating means comprises an electronic tube having an electrode connected to said accumulating means and to said anode, said tube being normally non-conducting and means coupled to said source for intermittently rendering said tube conductive to pass current varying with the charge on said accumulating means.

11. The combination with a photoelectric tube having a single photo cathode and an anode of means for creating an amplified alternating current signal varying in magnitude with the intensity of light incident on said photo cathode, comprising an electronic tube having an electrode directly connected to an electrode of said photoelectric tube, capacitative means comprising at least in part the inherent capacity of said tubes coupled to said connected electrodes, said electronic tube when rendered conductive completing a discharge path for said capacitative means, means including a separate source of fluctuating voltage for intermittently rendering said electronic tube conductive to pass current varying with the charge accumulated by said capacitative means and an alternating current amplifier for amplifying pulses created by intermittent current through said electronic tube.

12. The combination according to claim 11 wherein said source comprises a relaxation oscillator, and wherein said oscillator and amplifier are provided with a common source of operating potential whereby the gain of said amplifier varies with change in frequency of said oscillator in a direction to compensate for fluctuations in said source of operating potential.

13. A photo control circuit comprising a photoelectric tube having a photo cathode, a condenser connected to said photo cathode, an electronic tube having a cathode, a control grid and an anode, said anode being connected to said photo cathode and to said condenser, said cathode being grounded, a resistor connected between said cathode and said condenser for discharge of said condenser therethrough when said electronic tube is conductive, means connected to said control grid for normally biasing said electronic tube beyond cut-off, a relaxation oscillator connected to said control grid for intermittently removing the bias thereon, and means for amplifying the voltage pulses appearing across said resistor as a result of discharge of said condenser therethrough.

14. The circuit according to claim 13 wherein said amplifying means and said relaxation oscillator are provided with a common source of operating potential whereby the gain of said amplifying means varies with change in frequency of said oscillator in a direction to compensate for fluctuations in said source of operating potential.

15. The circuit according to claim 13 wherein said photoelectric tube, said condenser, said electronic tube, said resistor and at least part of said amplifying means are located in close proximity, said relaxation oscillator being physically remote from said control electrode and being connected thereto through a conductor provided with a grounded shield.

16. The combination with a photoelectric tube having a single anode and a single photo cathode of means for creating an amplified alternating current signal varying in magnitude in accordance with the intensity of light incident on the photo cathode, comprising a multielectrode electronic tube having an anode, a cathode and at least one grid, said tube being normally biased to be non-conductive, a separate source of fluctuating voltage connected to the electrode of said electronic tube for intermittently removing the bias thereon, a conductive connection between said photo cathode and a grid of said electronic tube whereby the intermittent removal of the bias causes pulses to appear at the anode of said electronic tube which vary with the charge of the inherent capacity associated with said photo cathode, said grid and the connection therebetween and alternating current amplifying means for amplifying said pulses.

17. The combination according to claim 16 wherein said photoelectric tube and electronic tube are positioned in close proximity and shielded by a grounded housing and shielded leads are provided for connecting the anode and cathode of said electronic tube to the amplifier and to a source of operating potential.

18. The combination comprising a photoelectric tube having a single light sensitive element and an anode, a normally open external circuit interconnecting said element and anode adapted when open to accumulate an electrical charge varying as a function of the intensity of light incident on said element, gating means adapted when intermittently actuated to complete intermittently said circuit and convert accumulated charges to voltage pulses, a source of fluctuating voltage connected to said gating means for automatically and intermittently actuating the same and alternating current amplifying means for amplifying the created voltage pulses.

19. The combination according to claim 18 wherein said external circuit includes a capacitor for accumulating electrical charge and said gating means comprises an electronic tube connected in series with an impedance across said capacitor, said source being connected to an electrode of said electronic tube to render the same intermittently conductive to complete a discharge path for said capacitor.

20. The combination according to claim 18 wherein said gating means comprises an electronic tube having an anode, a grid connected to said light sensitive element and a positively biased cathode connected to said source to be intermittently negatively pulsed to complete said circuit and discharge the inherent capacity associated with the light sensitive element, said grid and the connection therebetween.

21. The combination comprising a photoelectric tube having a light sensitive element and an anode, a normally open external circuit interconnecting said element and anode, a multi-electrode electronic tube adapted when rendered conductive to complete said circuit, biasing means normally rendering said electronic tube non-conductive, means including a source of fluctuating voltage connected to said electronic tube for automatically and intermittently overcoming said biasing means to thereby render said electronic tube intermittently conductive to convert any electrical charges accumulated in said circuit to voltage pulses, and alternating current amplifying means for amplifying created pulses.

References Cited in the file of this patent

UNITED STATES PATENTS

| | | |
|---|---|---|
| 2,049,355 | Cockrell | July 28, 1936 |
| 2,381,414 | Wilkie | Aug. 7, 1945 |
| 2,431,394 | Friedman | Nov. 25, 1947 |
| 2,442,240 | Hooker et al. | May 25, 1948 |
| 2,547,332 | Loveless | Apr. 3, 1951 |
| 2,605,447 | Troup | July 29, 1952 |
| 2,632,040 | Rabinow | Mar. 17, 1953 |
| 2,729,767 | Psoras et al. | Jan. 3, 1956 |